United States Patent
Kyomoto et al.

(10) Patent No.: US 11,192,990 B2
(45) Date of Patent: Dec. 7, 2021

(54) RESIN MOLDED BODY AND METHOD FOR PRODUCING RESIN MOLDED BODY

(71) Applicants: KYOCERA Corporation, Kyoto (JP); The University of Tokyo, Tokyo (JP)

(72) Inventors: Masayuki Kyomoto, Kyoto (JP); Kazuhiko Ishihara, Tokyo (JP)

(73) Assignees: Kyocera Corporation, Kyoto (JP); The University of Tokyo, Tokyo (JP)

( * ) Notice: Subject to any disclaimer, the term of this patent is extended or adjusted under 35 U.S.C. 154(b) by 261 days.

(21) Appl. No.: 16/482,175

(22) PCT Filed: Mar. 20, 2018

(86) PCT No.: PCT/JP2018/011223
§ 371 (c)(1),
(2) Date: Jul. 30, 2019

(87) PCT Pub. No.: WO2018/174107
PCT Pub. Date: Sep. 27, 2018

(65) Prior Publication Data
US 2019/0345316 A1 Nov. 14, 2019

(30) Foreign Application Priority Data

Mar. 21, 2017 (JP) .............................. JP2017-054328

(51) Int. Cl.
*C08L 23/06* (2006.01)
*C08J 7/056* (2020.01)
(Continued)

(52) U.S. Cl.
CPC ............. *C08J 7/056* (2020.01); *B29C 59/005* (2013.01); *C08L 23/06* (2013.01); *C08L 23/12* (2013.01);
(Continued)

(58) Field of Classification Search
CPC ... C08J 7/056; C08J 7/0427; C08J 7/08; C08J 2323/06; C08J 2323/12; B05D 3/0254
See application file for complete search history.

(56) References Cited

U.S. PATENT DOCUMENTS

| | | | | |
|---|---|---|---|---|
| 2003/0054155 | A1* | 3/2003 | Nomi | B32B 27/36 428/306.6 |
| 2005/0033256 | A1* | 2/2005 | Schmidt | C08J 3/12 604/370 |

(Continued)

FOREIGN PATENT DOCUMENTS

| | | |
|---|---|---|
| JP | 08-000723 A | 1/1996 |
| JP | 2003-310649 A | 11/2003 |

(Continued)

OTHER PUBLICATIONS

Li et al. Effect of Crystallinity of Polyethylene with Different Densities on Breakdown Strength and Conductance Property. Materials 2019, 12, 1746; doi:10.3390/ma12111746. (Year: 2019).*

(Continued)

*Primary Examiner* — Michael M Dollinger
(74) *Attorney, Agent, or Firm* — Volpe Koenig

(57) ABSTRACT

A resin molded body, includes: a polyolefin element including a crystalline region and an amorphous region; and a hydrophilic polymer contained in a region from a surface of the polyolefin element to part of the amorphous region located below the surface. Or, a method for producing a resin molded body, includes: preparing a polyolefin element including a crystalline region and an amorphous region; forming a coating of a hydrophilic polymer on a surface of the polyolefin element; and applying heat treatment to the polyolefin element on which the coating of the hydrophilic polymer is formed, wherein by applying the heat treatment, the coating of the hydrophilic polymer is immersed in a region from the surface to part of the amorphous region located below the surface.

10 Claims, 1 Drawing Sheet

(51) Int. Cl.
*C08L 23/12* (2006.01)
*B29C 59/00* (2006.01)
*B29K 23/00* (2006.01)

(52) U.S. Cl.
CPC .. *B29K 2023/0683* (2013.01); *B29K 2023/12* (2013.01); *B29K 2995/0039* (2013.01); *B29K 2995/0041* (2013.01)

(56) References Cited

U.S. PATENT DOCUMENTS

| | | | | |
|---|---|---|---|---|
| 2008/0213460 | A1* | 9/2008 | Benter | C08J 7/0427 427/2.1 |
| 2008/0286332 | A1* | 11/2008 | Pacetti | A61L 27/54 424/424 |

FOREIGN PATENT DOCUMENTS

| | | |
|---|---|---|
| JP | 2005-006704 A | 1/2005 |
| JP | 2008-527117 A | 7/2008 |
| JP | 4156945 B | 9/2008 |
| JP | 2010-059219 A | 3/2010 |
| JP | 2014-004352 A | 1/2014 |

OTHER PUBLICATIONS

Google Translation of JP 2870727 B2 (Year: 2021).*
Google Translation of JP 2005006704 A (Year: 2021).*
Google Translation of JP 2010059219 A (Year: 2021).*

* cited by examiner

PMPC layer
amorphous
lamella

PMPC layer

PMPC layer

RESIN MOLDED BODY AND METHOD FOR PRODUCING RESIN MOLDED BODY

CROSS-REFERENCE TO RELATED APPLICATIONS

This application is a national stage entry according to 35 U.S.C. 371 of International Application No. PCT/JP2018/011223 filed on Mar. 20, 2018, which claims priority to Japanese Patent Application No. 2017-054328 filed on Mar. 21, 2017, the contents of which are entirely incorporated herein by reference.

TECHNICAL FIELD

The present disclosure relates to a resin molded body capable of sustaining the water-aided slidability of the surface of a sliding member satisfactorily for a long period of time, and a method for producing a resin molded body.

BACKGROUND

Heretofore it has been customary to utilize a combination of a soft material such as resin and a hard material such as metal to form an artificial joint member such as a femoral head prosthesis and an acetabular prosthesis. For example, there is known an artificial joint including a femoral head prosthesis formed of a metal material such as stainless steel, a cobalt-chromium alloy, or a titanium alloy, and an acetabular prosthesis formed of a resin material such as ultrahigh-molecular-weight polyethylene, the femoral head prosthesis being fitted to the acetabular prosthesis serving as a receiving member.

Japanese Examined Patent Publication JP-B2 4156945 (Patent Literature 1) discloses the application of a polymeric material having a phosphorylcholine group to the sliding surface of such an artificial joint as a resin material capable of enhancement in lubrication in the sliding surface. According to the cited reference 1, the chemical structure of the polymeric material having a phosphorylcholine group is similar to that of a cell that constitutes a living tissue, and thus, even if the material is frictionally chipped, frictional wear-caused particulates do not harm to human body on account of their good biological compatibility.

SUMMARY

A resin molded body according to the disclosure includes: a polyolefin element formed of polyolefin, including a crystalline region and an amorphous region; and a hydrophilic polymer contained in at least part of a surface of the polyolefin element and in part of the amorphous region located below the surface.

A method for producing a resin molded body according to the disclosure includes the steps of:

preparing a polyolefin element formed of polyolefin, including a crystalline region and an amorphous region;

forming a coating of a hydrophilic polymer on at least part of a surface of the polyolefin element; and applying heat treatment to the polyolefin element on which the coating of the hydrophilic polymer coating is formed, wherein by applying the heat treatment, the coating of the hydrophilic polymer is immersed through the surface into part of the amorphous region located below the surface.

DETAILED DESCRIPTION

The following describes an embodiment of the disclosure.

A resin molded body according to the embodiment includes a polyolefin element formed of polyolefin, including a crystalline region and an amorphous region, and a hydrophilic polymer contained in at least part of a surface of the polyolefin element, and in part of the amorphous region located below the surface.

With its application to a resin-made acetabular prosthesis member which serves to receive a metal-made femoral head prosthesis member in an artificial joint in mind, the resin molded body according to the embodiment is configured so that the degree of friction (friction of sliding motion) between the sliding surface of the resin-made member and the metal-made member against which the sliding surface abuts can be kept low enough to minimize the occurrence of particulates due to friction (frictional wear-caused particulates), and that the frictional wear-caused particulates, if any, will never induce abnormal immune response in a living body.

Figure 1A:
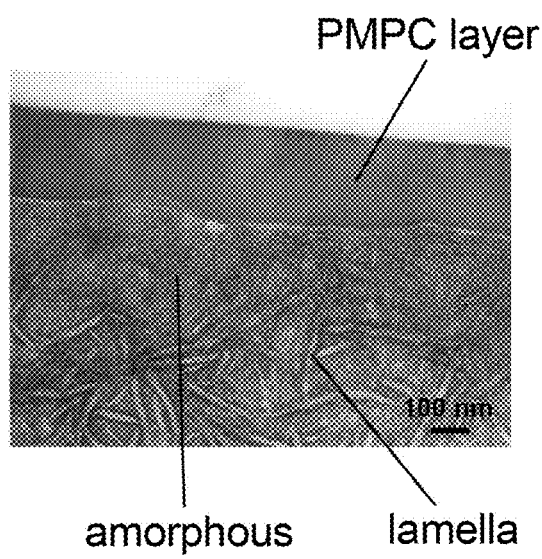
FIG. 1A is a sectional image of a resin-made base material, showing the surface thereof formed with a layer of poly(2-methacryloyloxyethyl phosphorylcholine) (hereafter referred to as "PMPC") which is one of hydrophilic polymers.
Figure 1B:
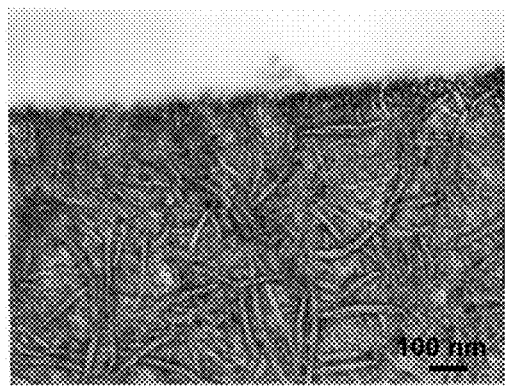
FIG. 1B is a sectional image showing the surface and nearby areas of the heat-treated base material.
Figure 1C:
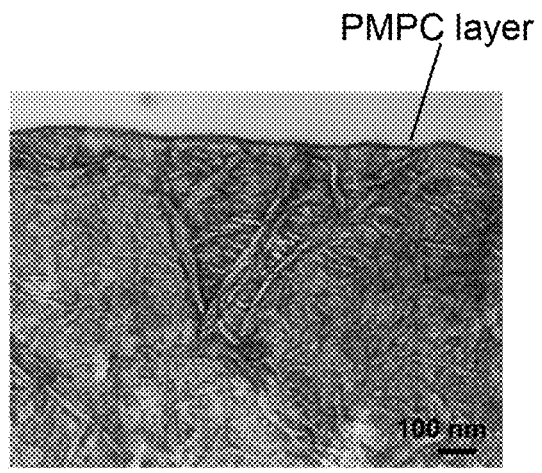
FIG. 1C is a sectional image showing the surface and nearby areas of the base material which has been soaked in water at a temperature close to a human body temperature for a week subsequent to the heat treatment.
Figure 1D:
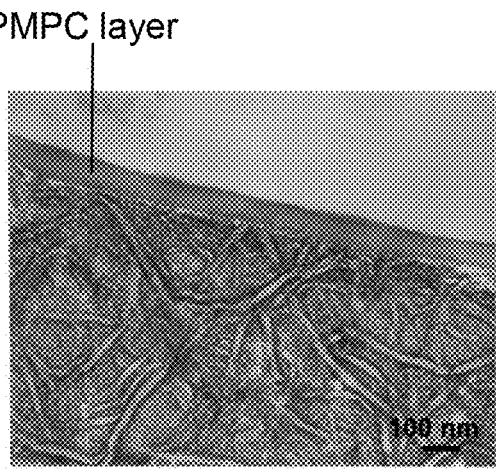
FIG. 1D is a sectional image showing the surface and nearby areas of the base material which has been soaked in water at a relatively high temperature for a week subsequent to the heat treatment.

FIG. 1A and FIG. 1B are views each showing the resin molded body according to the embodiment in its initial state, wherein FIG. 1A is an image taken by a transmission electron microscope (TEM image) showing the section of the surface of a base material formed of resin (Cross-Linked Polyethylene which will hereafter be referred to as "CLPE") with a PMPC layer formed by graft polymerization, and FIG. 1B is a TEM image showing the section of the surface and nearby areas of the base material which has been heat-treated at a temperature of 120° C. for two hours. Moreover, FIG. 1C is a TEM image showing the section of the surface and nearby areas of the base material which has been soaked in water at a temperature close to a human body temperature (about 37° C.) for a week subsequent to the heat treatment, and FIG. 1D is a TEM image showing the section of the surface and nearby areas of the base material which has been soaked in water at a relatively high temperature (about 70° C.) for a week subsequent to the heat treatment.

The resin molded body according to the embodiment (indefinite in shape) contains a polyolefin base material formed of relatively hard polyolefin (hereafter simply referred to as "base material"). As shown in the TEM image of FIG. 1B, at the outer surface of the resin molded body, the surface regions of the base material are left exposed in places, forming irregular surface asperities. Moreover, although the TEM image of FIG. 1B may not convey a clear image to facilitate understanding of the structure, an amorphous region layer located inside the outer surface (in the base material) has been impregnated with a hydrophilic polymer constituting a hydrophilic coating as later described by heat treatment.

In the resin molded body in its initial state as shown in FIG. 1B, the presence of the hydrophilic polymer inside the outer surface of the base material may be checked by conducting surface analysis using X-ray photoelectron spectroscopy (XPS) or near-surface section analysis using TEM and Energy-dispersive X-ray spectroscopy (EDS). Under heat treatment, the hydrophilic polymer is immersed in the base material through the outer surface thereof so as to reach a depth of 1000 nm or less, at a maximum, below the outer surface, depending on the average molecular weight of the hydrophilic polymer, the conditions set for the heat treatment, etc.

Examples of polyolefin constituting the base material include polyethylene and polypropylene. In particular, ultra-high-molecular-weight polyethylene having a weight-average molecular weight Mw of at least 3 million is preferable for use as the constituent of the base material. It is more preferable to use CLPE obtained by applying cross-linking treatment to ultrahigh-molecular-weight polyethylene under high-energy radiation (for example, under X-ray, gamma-ray, or electron-beam irradiation).

Examples of the hydrophilic polymer constituting the hydrophilic coating include poly(2-hydroxyethyl methacrylate), poly(ω-oligoethylene glycol mono-methacrylate), poly(2-(N,N-dimethylamino) ethyl methacrylate), poly(ethyl methacrylate phosphate), poly(sulfobetaine methacrylate), and poly(carboxybetaine methacrylate).

For example, in the interests of safety and harmlessness for human body, preferably, it is possible to use an uncross-linked phospholipid polymer having a weight-average molecular weight Mw of a million or less. For example, PMPC, poly(6-methacryloyloxyhexyl phosphorylcholine), poly(w-methacryloyloxyoligo (ethylene glycol) phosphorylcholine), and poly(4-stylyl oxybutyl phosphorylcholine) are preferably selected. The hydrophilic coating may be formed of either a single hydrophilic polymer or a hydrophilic copolymer composed of a plurality of different compounds. PMPC was selected as the hydrophilic polymer for use in the embodiment with consideration given to its utilization track records in the field of artificial joint.

A PMPC layer formed on the surface (sliding surface) of an artificial joint member of conventional design takes the form of a water-containing soft hydrogel layer when used in a living body. Thus, for example, for artificial joint replacement surgery, a specially-made surgical instrument having the same surface texture as that of the actual product (femoral head prosthesis) needs to be prepared to avoid a fracture in the PMPC layer, and also the operation of instruments for surgery needs to be done with extreme caution and discretion. Furthermore, after the placement of the artificial joint, etc. in a living body, in the event of a hard foreign object finding its way into the sliding surface for some reason during its movement (sliding motion), the PMPC layer located at the sliding surface may be damaged, causing failure of the PMPC layer to maintain its own high lubrication characteristics.

In this regard, in the resin molded body according to the embodiment, immediately after the immersion of the hydrophilic polymer serving as a surface treatment material (absorbate) under heat, the hydrophilic polymer remains infiltrated in the base material (polyolefin-made base material), and thus, at the surface of the resin molded body in its initial state (unused resin molded body in storage), there is little material which is relatively soft and prone to being damaged (hydrophilic polymer layer or hydrogel layer derived from hydrophilic polymer). This allows the resin molded body to exhibit high resistance to external scratching, etc.

Moreover, in the resin molded body according to the embodiment which has been shifted to watery surroundings, the hydrophilic polymer immersed inside a treatment (heating) target region gradually moves from the amorphous region layer lying under the target region toward the surface so as to appear on the damaged part of the surface as described above, and then fills in the damaged hydrophilic polymer-derived hydrogel layer. In consequence, a hydrophilic thin film (layer) is formed on the surface. Thus, in the resin molded body in watery surroundings, the damage such as injury on the surface of the molded product is automatically repaired to some extent, and also the amount of water of hydration increases in the treatment target region of the molded product surface, with the consequent increase of the degree of slidability (lubricity) of the molded product surface. In addition, the supply of the hydrophilic polymer from the amorphous region layer onto the surface does not proceed in one stroke but progresses slowly. Thus, in the resin molded body according to this embodiment, the water content and the hydrogel layer in the treatment target region of the surface are maintained with stability for a long period of time.

A method for producing the resin molded body thus formed includes (1) a step of preparing a polyolefin element formed of polyolefin, including a crystalline region and an amorphous region, (2) a step of forming a coating of a hydrophilic polymer on at least part of the surface of the polyolefin element, and (3) a step of applying heat treatment to the polyolefin element on which the coating of the hydrophilic polymer is formed, wherein by applying the earlier described heat treatment, the hydrophilic polymer in coating form is immersed through the surface of the polyolefin element into part of the amorphous region located below the surface.

More specifically, for example, where a CLPE base material is used, the first process step is to form a resin layer formed of a hydrophilic polymer such as PMPC (hydrophilic coating) on the surface of the base material by suitable means such as graft polymerization as shown in the TEM image of FIG. 1A. The resin layer formed of a hydrophilic polymer such as PMPC (hydrophilic coating) has a very smooth surface (with an average surface roughness of 1 nm or less). This process step exemplifies the step of forming a coating of a hydrophilic polymer on the surface of the polyolefin element.

Then, in an environment where neither the base material (CLPE) nor the hydrophilic polymer (such as PMPC) becomes soluble, expressed differently, in a vacuum, in the presence of inert gas, or in a solvent in which both the base material and the hydrophilic polymer become insoluble, the hydrophilic polymer constituting the hydrophilic coating is immersed in the base material by applying heat treatment at a temperature which is higher than or equal to a temperature at which minute crystal contained in the base material starts to melt (temperature in a range of 60° C. to 90° C.) but lower than or equal to the melting temperatures of the base material and the hydrophilic polymer (temperature of about 120° C. in this example). At this time, with the formation of a covalent bond between one of the hydrophilic polymer terminals and the base material (CLPE) in the treatment (heating) target region on the surface of the base material, the hydrophilic polymer is unevenly distributed over the base material surface. This process step exemplifies the step of applying heat treatment to the polyolefin element on which the coating of the hydrophilic polymer is formed.

As shown in FIG. 1B, after the immersion of the hydrophilic polymer as described above, the outer surface within the treatment (heating) target range has a rough surface (average surface roughness of about 5 nm) with the hydrophilic coating partly remaining thereon. The result of a surface hydrophilicity (hydrophobicity) evaluation in the target region showed that the static contact angle of atmospheric water in the target region ranges from 1 to 20 degrees.

The average surface roughness has been determined on the basis of image data obtained by carrying out a measurement on a test sample having an area of 1 μm² under an atomic force microscope (NanoScope IIIa manufactured by Veeco Instruments Inc.) with a single-crystal silicon cantilever in a dry environment, with scan rate set at 0.25 Hz and chip rate set at 5 μm per second.

Moreover, an evaluation of the static contact angle of water has been conducted with Sessile drop method using surface contact angle measuring equipment (Contact angle meter DM300 manufactured by Kyowa Interface Science Co., Ltd). In conformity with ISO 15989 standards, pure water in an amount of 1 μL on a droplet basis has been dropped on the surface of the test sample in the atmosphere, and, after a lapse of 60 seconds, the static contact angle has been measured by the Sessile drop method.

According to the above-described structure, in the resin molded body according to the embodiment, as contrasted to a conventional acetabular prosthesis member, a water-containing soft hydrogel layer is not formed on the surface of the molded product. This allows the molded product surface to have greater affinity for water. Thus, the molded product surface inherits scratching resistance (strength) from the base material constituting the molded product in itself, and, the resistance of the resin molded body to damage is far greater than the damage resistance of a conventional resin molded body having a hydrogel layer.

The use of the resin molded body according to the embodiment for a sliding member of an artificial joint or the like makes it possible to impart high resistance to external scratching, etc. to the sliding member, and thereby handle the member without exercising much care to avoid damage, and without preparing a specially-made surgical instrument for artificial joint replacement surgery, for example. It is also possible to reduce the number of member replacements due to a problem such as defectiveness resulting from damage arising prior to the placement of the member in a living body, and thereby improve production yields.

EXAMPLES

The following describes examples intended to exemplify the performance capabilities (properties) and assessment of the resin molded body according to the disclosure.

Of the examples, as Example 1, there was prepared a resin molded body formed of a cross-linked polyethylene (CLPE) base material impregnated with a hydrophilic polymer (PMPC) serving as a surface treatment material. The resin molded body was evaluated for resistance to scratching and surface hydrophilicity by measuring variation in scratching resistance (erosion rate) and variation in surface hydrophilicity (water contact angle) as an alternative to lubricity under various measurement conditions. Moreover, as Example 2, there was prepared a resin molded body obtained by forming, on the outer surface of the PMPC-impregnated resin molded body of Example 1, a hydrophilic coating formed of another PMPC layer (second hydrophilic coating in soft hydrogel form). In Example 2, after cutting away the second hydrophilic coating, the changes of the outer surface of the resin molded body have been recorded. The cross-linked polyethylene (CLPE) is an example of the polyolefin element. Moreover, the second hydrophilic coating is an example of "a coating formed of a hydrophilic polymer". The hydrophilic polymer refers to the earlier described hydrophilic polymer or other such as a hydrophilic resin.

The scratching resistance has been determined on the basis of the result of erosion rate evaluation using Micro Slurry-jet Erosion Tester (MSE-A) manufactured by Palmeso Co., Ltd. More specifically, with the tester, a jet of water alone was applied at an air-flow rate of 6.0 L/minute and at a water-flow rate of 125 mL/minute, and, a digging depth (nm) at which a jet of water (2.08 g) dug into the surface per second was measured to determine an erosion depth (nm/sec) from which the scratching resistance was derived.

Example 1

(0) A polyolefin base material was prepared by machining a base material formed of CLPE (cross-linked polyethylene (GUR 1020) manufactured by Celanase Corporation) having a weight-average molecular weight Mw of about 3.5 million (obtained through cross-linking treatment under gamma-ray irradiation at 50 kGy) into a predetermined form. In addition, 2-methacryloyloxyethyl phosphorylcholine (hereafter referred to as "MPC") was prepared as a compound which served as a raw material to form a hydrophilic coating.

(1) Formation of First Hydrophilic Coating

The MPC was subjected to graft polymerization at the surface of the CLPE base material to form a PMPC layer (about 100 nm in layer thickness), which became the first hydrophilic coating (for impregnation), on the surface of the base material (refer to the TEM image of FIG. 1A). Inside the base material surface, an amorphous region layer was observed which reached a depth of about 200 nm below the surface as a result of the collapse of lamellar crystal due to the machining operation.

(2) Impregnation of Base Material with First Hydrophilic Coating

In the presence of inert gas (nitrogen gas), the PMPC layer was immersed in the base material through the surface thereof by applying heat treatment at a temperature of 120° C. for 2 hours (refer to the TEM image of FIG. 1B). Following the completion of the heat treatment, while there was no sign of the PMPC layer formed (laminated) on the base material surface, the growth of a lamellar crystal region which was 100 to 400 nm in length and 10 to 30 nm in thickness (looks like streaks of folded-layer structure in the TEM sectional images) was recognized near the base material surface.

(3-1) Emergence 1 of Hydrophilic Coating by Soaking in Water

The PMPC-impregnated CLPE base material was soaked in water at a temperature of 37° C. for a week. The result was that the emergence of a layer derived from the PMPC immersed in the base material (hydrophilic coating having a layer thickness of about 10 nm) was recognized at the base material surface (refer to the TEM image of FIG. 1C).

(3-2) Emergence 2 of Hydrophilic Coating by Soaking in Water

The PMPC-impregnated CLPE base material was soaked in water at a temperature of 70° C. for a week. The result was that the emergence of a layer derived from the PMPC immersed in the base material (hydrophilic coating having a layer thickness of about 100 nm) was recognized at the base material surface (refer to the TEM image of FIG. 1D).

Table 1 shows the result of measurement of scratching resistance (erosion rate) and surface hydrophilicity (water contact angle) for each step in Example 1.

TABLE 1

| Step | Scratching resistance Erosion rate (nm/sec) | Surface hydrophilicity Water contact angle (degree) |
|---|---|---|
| (0) Base material with its surface in initial state | 0.2 | 90 |
| (1) Base material formed with hydrophilic coating | 2.5 | 30 |
| (2) Base material impregnated with hydrophilic coating | 0.2 | 10 |
| (3-1) Re-emergence 1 of hydrophilic coating | 2.5 | 10 |
| (3-2) Re-emergence 2 of hydrophilic coating | 2.5 | 10 |

Base material: CLPE

As seen from the measurement result given above, immediately after the immersion of the hydrophilic polymer under heat (Step (2)), the hydrophilic polymer remains infiltrated in the base material (polyolefin element), and thus there is little material which is relatively soft and prone to being damaged (hydrogel layer derived from the hydrophilic polymer) on the base material surface, with the consequent attainment of high resistance to external scratching, etc.

Moreover, after a shift to watery surroundings (Step (3-1), Step (3-2), etc.), the hydrophilic polymer immersed in the base material gradually moves from the amorphous region layer lying under the treatment target region toward the surface so as to appear on the surface, forming a hydrophilic thin film (layer) at the surface. In consequence, the resin molded body according to the embodiment can exhibit good lubricity once again in the above-described watery surroundings.

Example 2

(A) As in the case of Example 1, a polyolefin base material was prepared by machining a base material formed of CLPE (cross-linked polyethylene (GUR 1020) manufactured by Celanase Corporation) having a weight-average molecular weight Mw of about 3.5 million (obtained by cross-linking treatment under gamma-ray irradiation at 50 kGy) into a predetermined form. In addition, MPC was prepared as a compound which serves as a raw material to form a hydrophilic coating.

(B) Formation of First Hydrophilic Coating

As in the case of Example 1, the MPC was subjected to graft polymerization at the surface of the CLPE base material to form a PMPC layer (about 100 nm in layer thickness), which became the first hydrophilic coating (for impregnation), on the surface of the base material (refer to the TEM image of FIG. 1A). Inside the base material surface, an amorphous region layer was observed which reached a depth of about 200 nm below the surface as a result of the collapse of lamellar crystal due to the machining operation.

(C) Impregnation of Base Material with First Hydrophilic Coating

As in the case of Example 1, in the presence of inert gas (nitrogen gas), the PMPC layer was immersed in the base material through the surface thereof by applying heat treatment at a temperature of 120° C. for 2 hours (refer to the TEM image of FIG. 1B). Following the completion of the heat treatment, while there was no sign of the PMPC layer formed (laminated) on the base material surface, the growth of lamellar crystal which was 100 to 400 nm in length and 10 to 30 nm in thickness (looks like folded layers) was recognized near the base material surface.

(D) Formation of Second Hydrophilic Coating

As with the first hydrophilic coating, at the surface of the PMPC layer-impregnated base material, the MPC has been subjected to graft polymerization once again to form a PMPC layer (about 100 nm in layer thickness), which becomes the second hydrophilic coating (for placement on the surface), on the surface of the base material.

(E) Removal of Second Hydrophilic Coating

On the assumption that the second hydrophilic coating shows signs of wear and tear or damage, the second hydrophilic coating was scraped off the base material surface with a metallic wire or the like.

(F-1) Reproduction 1 of Hydrophilic Coating by Soaking in Water

After the removal of the second hydrophilic coating, the PMPC-impregnated CLPE base material was soaked in water at a temperature of 37° C. for a week. The result was that the re-emergence of a layer derived from the PMPC immersed in the base material (hydrophilic coating having a layer thickness of about 10 nm) was recognized at the base material surface (refer to the TEM image of FIG. 1C).

(F-2) Reproduction 2 of Hydrophilic Coating by Soaking in Water

After the removal of the second hydrophilic coating, the PMPC-impregnated CLPE base material has been soaked in water at a temperature of 70 deg. C. for a week. The result was that the emergence of a layer derived from the PMPC immersed in the base material (hydrophilic coating having a layer thickness of about 100 nm) was recognized at the base material surface (refer to the TEM image of FIG. 1D).

Table 2 shows the result of measurement of scratching resistance (erosion rate) and surface hydrophilicity (water contact angle) for each step in Example 2.

TABLE 2

| Step | Scratching resistance Erosion rate (nm/sec) | Surface hydrophilicity Water contact angle (degree) |
|---|---|---|
| (A) Base material with its surface in initial state | 0.2 | 90 |
| (B) Base material formed with first hydrophilic coating | 2.5 | 30 |
| (C) Base material impregnated with first hydrophilic coating | 0.2 | 10 |
| (D) Base material formed with second hydrophilic coating | 2.5 | 30 |
| (E) Base material with second hydrophilic coating removed | 0.2 | 10 |
| (F-1) Re-emergence 1 of hydrophilic coating | 2.5 | 10 |
| (F-2) Re-emergence 2 of hydrophilic coating | 2.5 | 10 |

Base material: CLPE

As seen from the measurement result given above, immediately after the immersion of the first hydrophilic polymer under heat (Step (C)), and after the removal of the second hydrophilic polymer (Step (E)), as in the case of Example 1, the hydrophilic polymer remains infiltrated in the base material (polyolefin element), and thus there was little material which is relatively soft and prone to being damaged (hydrogel layer derived from the hydrophilic polymer) at the base material surface, with the consequent attainment of high resistance to external scratching, etc.

Moreover, in watery surroundings (Step (F-1), Step (F-2), etc.), the hydrophilic polymer immersed in the base material gradually moves from the amorphous region layer lying under the treatment target region toward the surface so as to appear on the surface. That is, after the resin molded body has been implanted in a living body, on impairment of the hydrogel layer conducive to lubrication in the surface of the molded product, a similar hydrogel layer (lubricating layer) is re-formed at the surface of the molded product in the living body. Thus, the resin molded body according to the examples has self-repairing capability to achieve autonomous compensation for the impairment of hydrophilicity and lubricity.

The following describes examples employing a polypropylene element as a base material.

Example 3

(G) A polyolefin base material was prepared by machining a base material formed of PP (polypropylene plate PP-8000-N1 manufactured by SEKISUI SEIKEI Co., Ltd) into a predetermined form. In addition, MPC was prepared as a compound which serves as a raw material to form a hydrophilic coating.

(H) Formation of First Hydrophilic Coating

As in the case of Example 2, the MPC was subjected to graft polymerization at the surface of the PP base material to form a PMPC layer (about 100 nm in layer thickness), which became the first hydrophilic coating (for impregnation), on the surface of the base material.

(I) Impregnation of Base Material with First Hydrophilic Coating

As in the case of Example 2, in the presence of inert gas (nitrogen gas), the PMPC layer was immersed in the base material through the surface thereof by applying heat treatment at a temperature of 120° C. for 2 hours. Following the completion of the heat treatment, while there was no sign of the PMPC layer formed (laminated) on the base material surface, the growth of lamellar crystal was recognized near the base material surface.

(J) Formation of Second Hydrophilic Coating

As with the first hydrophilic coating, at the surface of the PMPC layer-impregnated base material, the MPC was subjected to graft polymerization once again to form a PMPC layer (about 100 nm in layer thickness), which became the second hydrophilic coating (for placement on the surface), on the surface of the base material.

(K) Removal of Second Hydrophilic Coating

On the assumption that the second hydrophilic coating showed signs of wear and tear or damage, the second hydrophilic coating was scraped off the base material surface with a metallic wire or the like.

(M) Reproduction of Hydrophilic Coating by Soaking in Water

After the removal of the second hydrophilic coating, the PMPC-impregnated PP base material was soaked in water at a temperature of 70° C. for a week. The result was that the emergence of a layer derived from the PMPC immersed in the base material (hydrophilic coating having a layer thickness of about 100 nm) was recognized at the base material surface.

Table 3 shows the result of measurement of scratching resistance (erosion rate) and surface hydrophilicity (water contact angle) for each step in Example 3.

TABLE 3

| Step | Scratching resistance Erosion rate (nm/sec) | Surface hydrophilicity Water contact angle (degree) |
| --- | --- | --- |
| (G) Base material with its surface in initial state | 0.1 | 90 |
| (H) Base material formed with first hydrophilic coating | 2.5 | 30 |
| (I) Base material impregnated with first hydrophilic coating | 0.1 | 10 |
| (J) Base material formed with second hydrophilic coating | 2.5 | 30 |
| (K) Base material with second hydrophilic coating removed | 0.1 | 10 |
| (M) Re-emergence of hydrophilic coating | 2.5 | 10 |

Base material: PP

As seen from the measurement result given above, even with use of the PP base material, in watery surroundings (Step (M), etc.), the hydrophilic polymer immersed in the base material gradually moves from the amorphous region layer lying under the treatment target region toward the surface so as to appear on the surface. That is, even with use of other base material than the CLPE base material, after the resin molded body has been implanted in a living body, on impairment of the hydrogel layer conducive to lubrication in the surface of the molded product, a similar hydrogel layer (lubricating layer) can be re-formed at the surface of the molded product in the living body as a self-repairing phenomenon.

That is, in that one of the resin molded bodies according to the embodiment which includes the second coating formed of a hydrophilic polymer (second hydrophilic coating) formed externally of the surface, even on loss of the subsequently provided, additional second hydrophilic coating caused by wear or friction, in watery surroundings, the hydrophilic polymer is fed from the amorphous region layer onto the surface, with the consequent compensation for the hydrophilic coating loss. Thus, among the resin molded bodies according to the embodiment, in a resin molded body which includes the hydrophilic polymer- or other hydrophilic resin-made second hydrophilic coating formed on an outside of the surface, even on loss of the hydrophilic coating and on impairment of lubricity derived from water contained in the hydrophilic coating caused by wear and tear, sliding motion, etc., autonomous restoration can be achieved afterward, that is; the resin molded body has self-repairing capability.

The disclosure may be embodied in other specific forms without departing from the spirit or essential characteristics thereof. The present embodiments are therefore to be considered in all respects as illustrative and not restrictive, the scope of the disclosure being indicated by the appended claims rather than by the foregoing description and all changes which come within the meaning and the range of equivalency of the claims are therefore intended to be embraced therein.

The invention claimed is:

1. A method for producing a resin molded body, the method comprising:
    preparing a polyolefin element formed of polyolefin, comprising a crystalline region and an amorphous region;
    forming a coating of a hydrophilic polymer on at least part of a surface of the polyolefin element; and applying heat treatment to the polyolefin element on which the coating of the hydrophilic polymer is formed, wherein by applying the heat treatment, the coating of the hydrophilic polymer is immersed through the surface of the polyolefin element into part of the amorphous region located below the surface.

2. The method according to claim 1, wherein the polyolefin comprises polyethylene or polypropylene.

3. The method according to claim 2, wherein the polyolefin comprises ultrahigh-molecular-weight polyethylene having a weight-average molecular weight Mw of at least 3 million.

4. The method according to claim 2, wherein the polyolefin comprises polyethylene obtained by applying cross-linking treatment to ultrahigh-molecular-weight polyethylene having a weight-average molecular weight Mw of at least 3 million under energy radiation which corresponds to at least one of X-ray irradiation, gamma-ray irradiation, and electron-beam irradiation.

5. The method according to claim 1, wherein the hydrophilic polymer prior to being subjected to the heat treatment comprises a phospholipid polymer.

6. The method according to claim 5, wherein the hydrophilic polymer prior to being subjected to the heat treatment comprises a phospholipid polymer having a weight-average molecular weight Mw of a million or less.

7. The method according to claim 5, wherein the hydrophilic polymer prior to being subjected to the heat treatment comprises an uncrosslinked phospholipid polymer having a weight-average molecular weight Mw of a million or less.

8. The method according to claim 1, wherein the polyolefin element prior to being subjected to the heat treatment comprises an amorphous region layer, and at least part of the surface of the polyolefin element corresponds to a surface of the amorphous region layer.

9. The method according to claim 8, wherein at least part of the amorphous region layer in the polyolefin element prior to being subjected to the heat treatment is changed to a mixed layer comprising a lamellar crystal-containing crystalline region and an amorphous region by the heat treatment.

10. The method according to claim 1, further comprising:

forming, subsequent to the heat treatment, a coating formed of a hydrophilic polymer on at least part of the surface of the polyolefin element.

\* \* \* \* \*